United States Patent [19]
Laib

[11] Patent Number: 5,467,699
[45] Date of Patent: Nov. 21, 1995

[54] GARLIC PRESS

[75] Inventor: Douglas M. Laib, Kissimmee, Fla.

[73] Assignee: Dart Industries Inc., Deerfield, Ill.

[21] Appl. No.: 306,793

[22] Filed: Sep. 15, 1994

[51] Int. Cl.$^6$ .............................. A47J 19/06; A47J 42/34; B30B 7/00; B30B 9/02
[52] U.S. Cl. .............................. 99/495; 99/508; 100/112; 100/125; 100/234
[58] Field of Search .............................. 99/495–497, 501, 99/458, 507, 508; 100/112, 125, 233, 234, 243, 902

[56] References Cited

U.S. PATENT DOCUMENTS

| | | | |
|---|---|---|---|
| D. 279,754 | 7/1985 | Hansen . | |
| 1,762,031 | 6/1930 | Roberts | 100/234 |
| 3,580,168 | 5/1971 | Zysset | 100/234 |
| 4,069,752 | 1/1978 | Ahner | 100/112 |
| 4,348,950 | 9/1982 | Harris | 99/495 |
| 4,466,346 | 8/1984 | Gemel . | |
| 4,531,457 | 7/1985 | Sivaslian . | |
| 4,545,299 | 10/1985 | Ahner . | |
| 4,582,265 | 4/1986 | Petronelli . | |
| 4,794,854 | 1/1989 | Swaim . | |
| 5,101,720 | 4/1992 | Bianchi . | |
| 5,163,362 | 11/1992 | Gaber et al. . | |
| 5,165,335 | 11/1992 | Bianchi . | |
| 5,303,640 | 4/1994 | Gaber et al. | 99/495 |
| 5,370,044 | 12/1994 | Lackie | 99/495 X |

Primary Examiner—Timothy F. Simone
Attorney, Agent, or Firm—John A. Doninger

[57] ABSTRACT

A garlic press including elongate arms pivotally joined at one end by a releasable hinge assembly. The arms, spaced from the hinge assembly, include an apertured receptacle and a press member pivotally received therein. The hinge assembly includes hinge knuckles forming a transverse passage and a removable hinge pintle rotatably joining the knuckles. The hinge pintle has a cleaning member on one end thereof with projections insertable within the receptacle apertures for cleaning of the apertures upon removal of the pintle from the hinge knuckle passage.

12 Claims, 4 Drawing Sheets

U.S. Patent     Nov. 21, 1995     Sheet 1 of 4     5,467,699
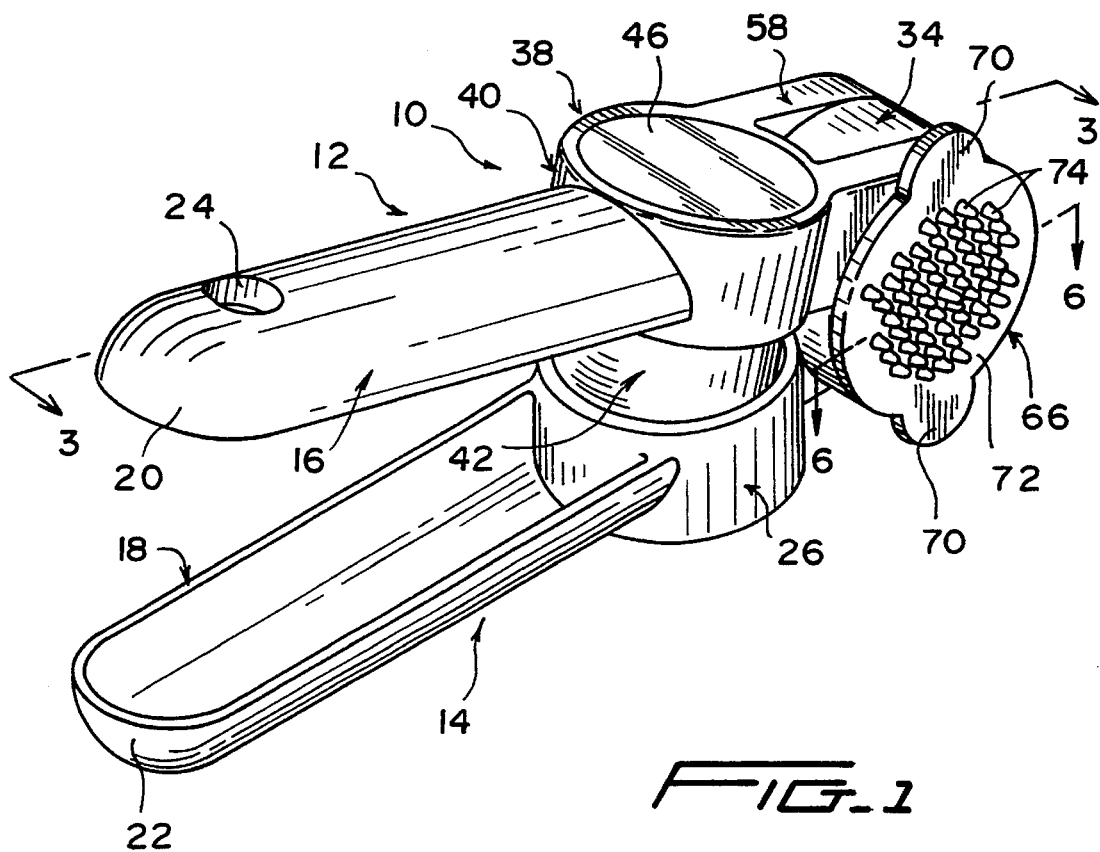
FIG_1
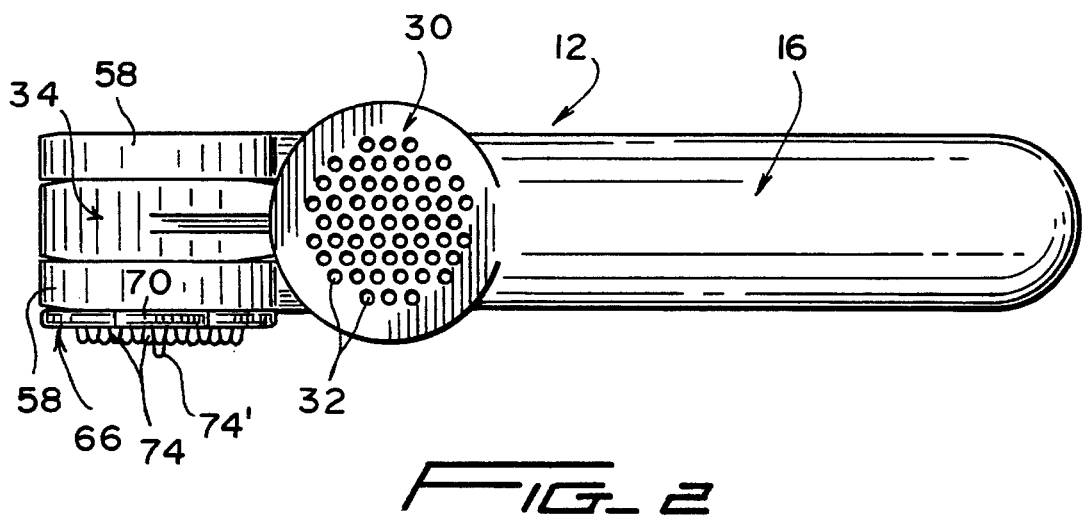
FIG_2

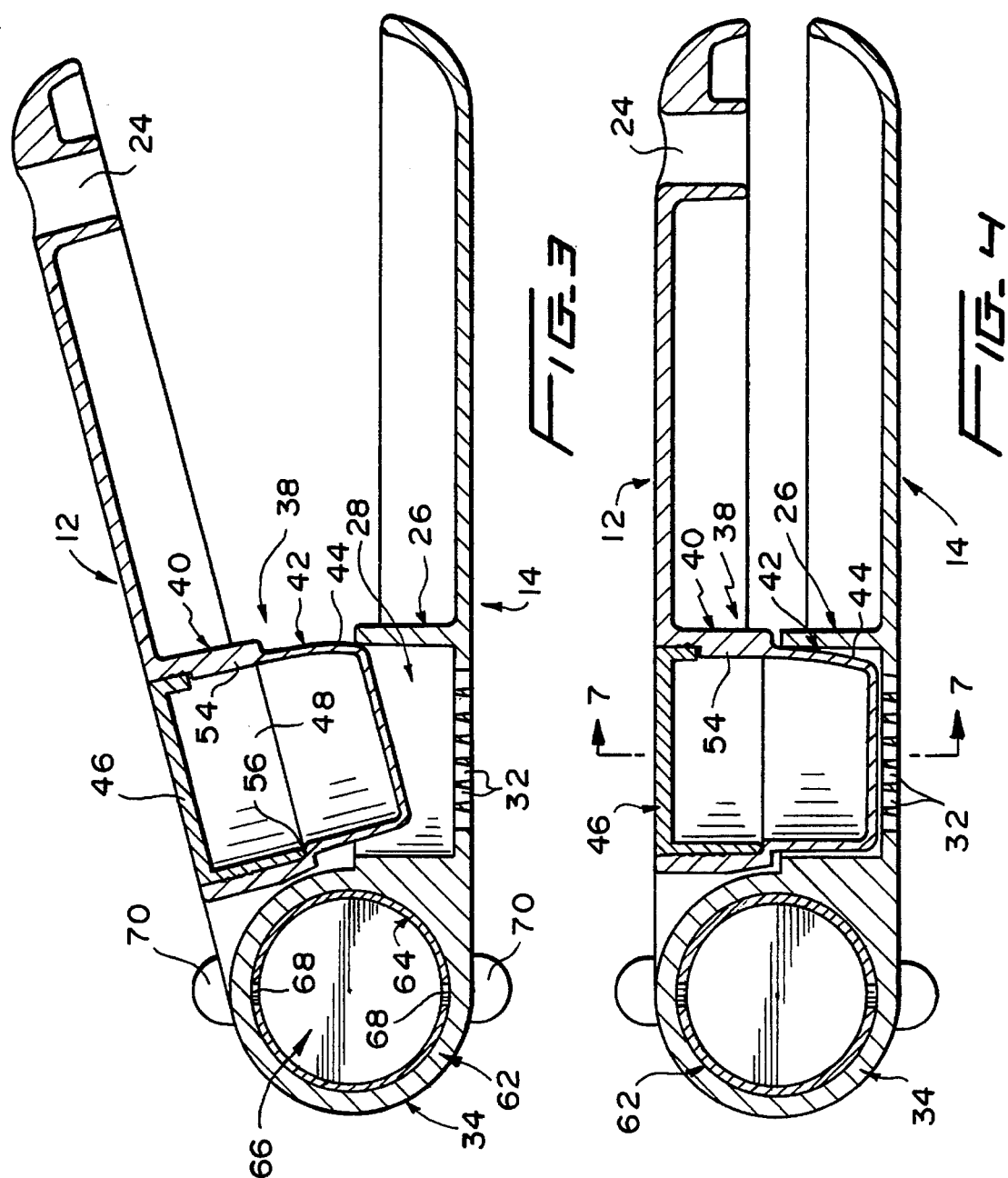

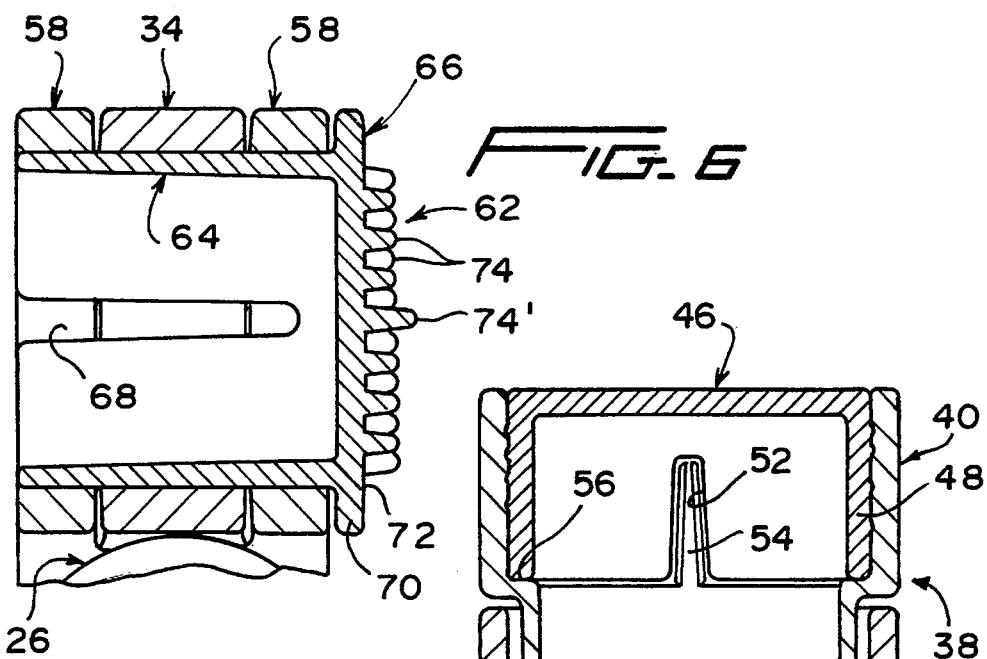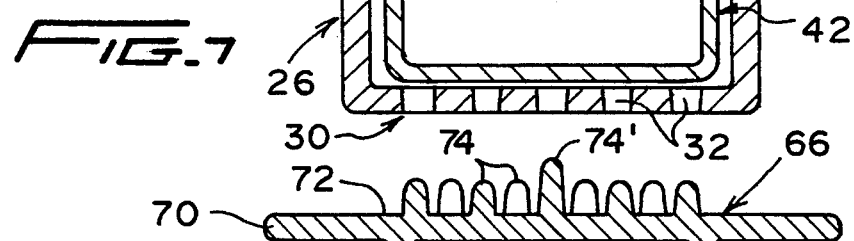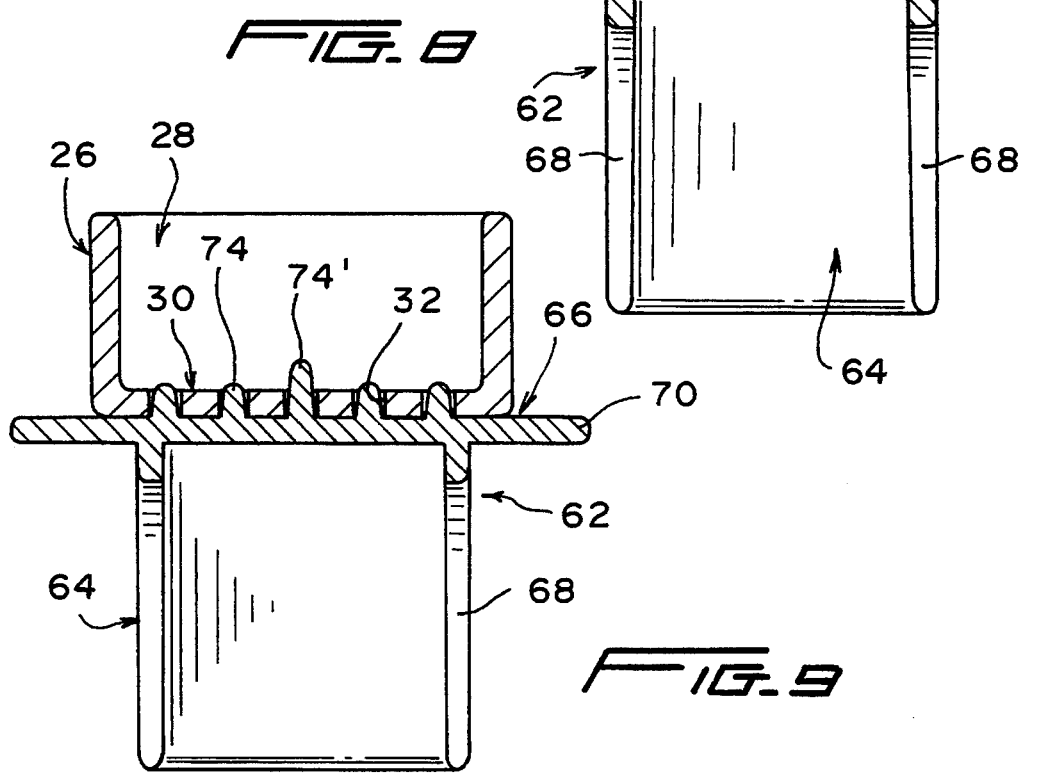

GARLIC PRESS

BACKGROUND OF THE INVENTION

Hand presses for garlic cloves, onions, and other foodstuffs, principally fruits and vegetables, come in a variety of configurations and modes of operation. Possibly the most common form of garlic press utilizes pivotally mounted hand-manipulatable arms with a perforated basket or receptacle on one arm and a pressure member or plunger on the other arm engageable within the basket for the crushing of garlic and the like.

Such garlic presses, in the known art, can incorporate a cleaning section integral therewith and engageable through the basket perforations, normally by inverting the arms relative to the pressing or crushing position thereof.

Notwithstanding the cleaning effect of the cleaning section, there still remains substantial residue which must be cleaned from the press, and in fact from the cleaning section itself if a sanitary and odor free implement is to be maintained. This is difficult in a press wherein the components are permanently assembled, that is assembled in a manner not intended to be separated from each other, as is the case with most known prior art hand presses.

SUMMARY OF THE INVENTION

The present invention is a hand press for garlic and like foodstuffs utilizing a lever action and wherein the two arms thereof respectively mount press components. The press components comprise a receptacle defining a compartment with a perforated bottom or inner wall, and a pressure plunger or member receivable within the receptacle compartment to crush the foodstuff against the perforated base bottom whereby juices and particles are formed and discharged through the apertures of the perforated bottom.

The two arms of the press are releasably joined at one end thereof by a multiple function hinge member including a hinge pintle and a cleaning member. The pintle is introduced through a passage defined by aligned hinge knuckles on the arms. The cleaning member is an enlarged head with outwardly extending pins or projections thereon fixed on one end of the pintle to additionally function as a handle for the introduction and removal of the pintle. The pintle, in turn, functions as a handle for the cleaning member. The arrangement of the cleaning protuberances or projections correspond to the arrangement of drainage apertures in the receptacle bottom for a cleaning of these apertures upon the introduction of the projections inwardly therethrough.

Basically, after the pressing operation, the hinge pintle is removed, disengaging the lever arms from each other and allowing use of the cleaning member, with the pintle or pivot shaft acting as a handle. After an initial cleaning of the apertures, which will assist also in removing the crushed garlic clove or the like, the three components of the press can be individually cleaned with the elements of the pivot joinder easily accessed to effectively clean any residue therefrom.

Assembly of the press merely involves an alignment of the hinge elements or knuckles of the two arms and the introduction of the pintle therethrough. As will be appreciated, the relationship between the pintle and the hinge passage defined by the aligned hinge knuckles, is such as to releasably retain the pintle in position while allowing for pivotal movement of the arms relative to each other.

These and other features of the invention will become apparent from the more detailed description of the invention, and the manner of use thereof, following hereinafter.

BRIEF DESCRIPTION OF THE DRAWINGS

FIG. 1 is a perspective view of the garlic press partially closed;

FIG. 2 is a bottom plan view of the garlic press;

FIG. 3 is a longitudinal cross-sectional view of the partially closed garlic press taken substantially on a plain passing along line 3—3 in FIG. 1;

FIG. 4 is a longitudinal cross-sectional view similar to FIG. 3 with the garlic press completely closed as when fully compressing a received garlic clove or the like;

FIG. 6 is an enlarged cross-sectional detail substantially on a plane passing along line 6—6 in FIG. 1;

FIG. 7 is a transverse cross-sectional view taken substantially on a plane passing along line 7—7 in FIG. 4;

FIG. 8 is an enlarged cross-sectional detail through the multiple function hinge unit forming both the hinge pintle with handle means and the cleaning member with handle means; and FIG. 9 is an enlarged cross-sectional detail illustrating the manner of use of the cleaning member.

DESCRIPTION OF PREFERRED EMBODIMENT

Figure 5:
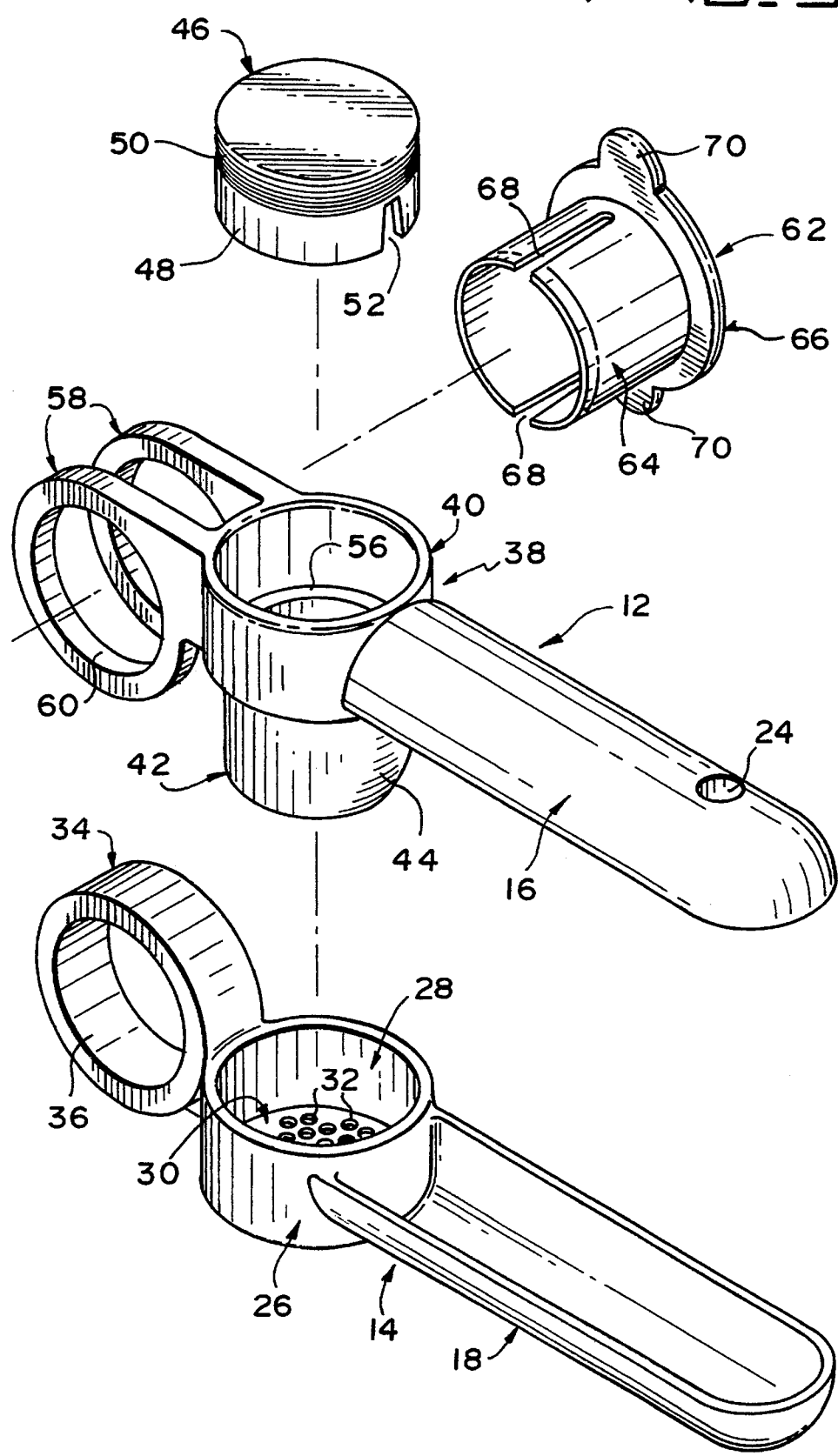
FIG. 5 is an exploded perspective view of the separately molded components of the garlic press.

The garlic press 10 basically comprises upper and lower hand-manipulatable arms 12 and 14. The arms 12 and 14 respectively include substantially duplicate elongate handles or hand grip portions 16 and 18 of an appropriate rigid synthetic resinous material molded into a transversely arcuate configuration defining opposed inwardly directed elongate cavities. So configured, the handles 16 and 18 provide smooth arcuate exterior gripping surfaces in conjunction with a high degree of rigidity and minimal weight.

The respective rear ends 20 and 22 of arms 12 and 14 include intregal arcuate end portions or caps which strengthen the respective handles by integrally joining the opposed sides of the corresponding arms defined by the transverse arcuate configuration of the arms.

As desired, the upper arm 12, toward the rear closed end 20 thereof, can be provided with a reinforced aperture 24 therethrough as a means for hanging the garlic press on a storage peg or the like.

The lower arm 14, intregal with the forward end of the handle 18, includes a preferably circular receptacle 26 of a diameter greater than the transverse width of handle 18. The receptacle 26 defines an upwardly opening interior compartment 28 having a smooth interior wall surface and a flat bottom wall 30 with multiple pulp and liquid draining apertures 32 therethrough. The receptacle compartment 28, while preferably circular in cross-section and of a constant diameter for the full height thereof, can be of other configurations, but of necessity of a size to receive the particular foodstuff to be pressed therein.

The lower arm 14 is completed by a single forwardly extending hinge knuckle 34 defining a transverse opening 36 therethrough. The knuckle 34, receptacle 26 and handle 18 are preferably molded as a single unit of an appropriate food compatible, rigid synthetic resinous material.

Noting the cross-sectional views of FIGS. 3 and 4, the lowermost surfaces of the knuckle 34, receptacle 26 and handle 18 are co-planer, with the wall of the receptacle 26 projecting slightly higher than the opposed upper edges of the handle 18, while the knuckle 34 projects to a height substantially equal to the combined height of the two arms when closed.

Turning now to the upper arm 12, the forward end of the handle or handle portion 16 thereof is integrally formed with the side wall of the pressure member 38. The pressure member 38 includes an upper portion 40 of substantially the same size and shape as the receptacle 26 of the lower arm 14 to align and overly the receptacle 26 upon a closing of the arms 14 and 16 toward each other.

The pressure member 38 also includes a lower portion 42 of a diameter as to be closely although freely slidably received within the receptacle compartment 28 as the garlic press 10 is closed. This lower portion 42, comprising a pressure plug, includes a flat bottom which in the closed position of the press closely overlies the perforated bottom 30 of the receptacle 26, and a slightly arcuate or inwardly and downwardly inclined rear wall portion 44 which facilitates an accommodation of the pressure plug 42 into the receptacle compartment 28 as the pressure member is downwardly pivoted into the compartment. This particular feature will be best appreciated from FIG. 3.

The pressure member 38 is formed with an upwardly opening hollow interior or interior chamber which facilitates molding, reduces the amount of material required and reduces the overall weight.

It is contemplated that the upper end of the pressure member chamber be sealed, preferably in a relatively permanent manner, by a cap or insert 46. It is contemplated that this insert, on the upper exposed surface thereof, bear identifying inertia, for example, the manufacturers name. The insert 46 includes a depending peripheral skirt 48 which is frictionally received within the upper open end portion of the pressure member 38, the pressure fit being enhanced by a series of external peripheral ribs 50 about the upper end of the skirt 48 as noted in FIG. 5 whereby a substantially permanent mounting of the insert 46 is achieved.

In order to properly align the proposed indicia on the upper surface of the insert 46, the skirt 48 will preferably include a vertically upwardly directed tapered notch 52 which is received over a similarly configured rib 54 extending vertically upward from a peripheral shoulder 56 formed within the pressure member chamber between the upper and lower portions 40 and 42 thereof. Incidentally, this shoulder 56 will also form a support for the lower edge of the insert skirt 48 to define its mounted position. The notch 52, in the skirt 48, will introduce a minor degree of resilient flexibility within the skirt to facilitate insertion of the insert 46.

Formed integrally with and projecting forward of the upper arm pressure member 38 is a pair of hinge knuckles 58 laterally spaced from each other to slidably receive the lower arm knuckle 34 therebetween. The knuckles 58, while generally transversely thinner than the knuckle 34, are otherwise of equal size with the knuckle 34 and similarly define aligned transverse openings 60 which align and define a common transverse passage with the opening 36 upon a nesting or interdigitating of the knuckles 34 and 58. As noted in FIG. 4 in particular, the upper longitudinal extremity of the upper arm handle, pressure member, insert and knuckles are in a common plane. As with the bottom arm assembly, the upper arm assembly, other than for the insert, is preferably molded as a single unit of a suitable food compatible rigid synthetic resinous material.

The upper and lower arms 12 and 14 are pivotally joined for manual operation of the hand press by a removable and multiple functional hinge element 62. The hinge element includes an elongate hollow cylindrical hinge pin or pintle 64 with an enlarged disc or plate member 66 integrally joined to one end thereof.

The pintle 64 is of substantially equal length with the transverse length of the assembled knuckles 34 and 58, and dimensionally of a size for snug reception within the aligned openings 36 and 60 to retain the knuckles assembled while allowing for pivotal movement of the arms relative to each other for use of the press in an obvious manner. For ease in mounting and removal of the pintle 64 while at the same time providing for an effective retention of the interdigitated hinge knuckles when assembled, the pintle 64, extending inward from the open end thereof, or the end opposed from the panel 66, includes a pair of diametrically opposed inwardly extending and inwardly tapering slots or notches 68. The slots 68 allow for a slight resilient flexing of the pintle sections toward each other as the pintle is inserted. In addition, and through the inherent resiliency of the material of the pintle, after insertion the compressed pintle sections will exert an outward pressure on the hinge passage to stabilize the assembly.

The end panel or disc 66 is preferably of a circular configuration corresponding to that of the hinge knuckles in both size and configuration so as to lie flush against the outermost knuckle surface and act as a convenient handle means for grasping and manipulating the pintle 64. The handle nature of this end panel 66 is enhanced by a pair of intregal radially outward projecting gripping ears or lugs 70 at diametrically opposed positions on the periphery of the panel 66.

The multiple function hinge member 62 also and significantly functions as a cleaning member for the apertures 32 in the receptacle bottom 30. To this end, the outer face 72 of the panel 66 is provided with multiple projections or protrusions 74 integrally formed thereon and corresponding in number and orientation to the receptacle apertures 32. This relationship is suggested in FIG. 9 wherein it will also be noted that the projections 74 are of a size to be closely received through the apertures 32 and of a length so as to project completely therethrough. A single central projection 74' can be provided as a guide means for engagement within a corresponding aperture to quickly aligning the projections with the apertures during the cleaning step.

It is significant to note that when the hinge member 62 is used as a means for cleaning the receptacle apertures 32, the pintle 64 functions as a handle by which the cleaning head, defined by the disc 66 and projection 74, can be easily and firmly manipulated.

It will also be appreciated that upon removal of the pintle 64 from the hinge knuckle assembly, the upper and lower arm units can be separated for individual and thorough cleaning, including both the hinge knuckles and the pintle. Likewise, with the upper arm unit completely removed, the cleaning of the pressing compartment 28 will be simplified.

The foregoing described embodiment is illustrative of the invention. As other embodiments incorporating the inventive features of the invention may occur to those skilled in the art, the disclosed embodiment is not to be considered as a limitation on the scope of the invention. Rather, the invention is only to be limited by the scope of the claims following hereinafter.

The invention claimed is:

1. A hand press for foodstuffs comprising first and second elongate arms, each arm including a hand grip portion and a press component, said press component on said first arm comprising a compartment on said first arm remote from said hand grip portion thereof, said compartment including an inner wall with multiple draining apertures therethrough for discharge of effluent from a pressed foodstuff, said press component on said second arm comprising a pressure member on said second arm remote from said hand grip portion thereof for compression of a foodstuff within said compartment, said pressure member being configured for close slidable reception within said compartment, pivot means pivotally joining said arms remote from said hand grip portions and said press components wherein selective pivotal movement of said hand grip portions toward and away from each other will produce a corresponding movement of said press components toward and away from each other, said pivot means comprising hinge means on said first and second arms aligning with each other and defining a passage therethrough transversely of said arms, and a hinge pintle removably received within said passage and retaining said arms for pivotal movement of said arms relative to each other, and a cleaning portion on said pintle manipulable, upon removal of said pintle from said passage, to engage and clean said draining apertures.

2. The hand press of claim 1 wherein said pintle has a leading end for introduction into said passage, and a following end manually engageable for positioning of said pintle.

3. The hand press of claim 2 wherein said cleaning portion is on one of said pintle ends.

4. The hand press of claim 3 wherein said cleaning portion is on said following end.

5. The hand press of claim 4 wherein said cleaning portion is transversely enlarged relative to said pintle.

6. The hand press of claim 5 wherein said cleaning portion includes multiple projections thereon selectively introducible into and through said drainage apertures for removal of debris therefrom.

7. The hand press of claim 6 wherein said apertures are of a predetermined number and in a predetermined pattern, said projections being of a complimentary pattern for substantially simultaneous engagement through said apertures.

8. The hand press of claim 7 wherein one of said projections comprises a guide projection and is of a greater length than the remaining projections for engagement within a corresponding guide aperture to position said projections for reception within the complimentary apertures.

9. The hand press of claim 8 wherein said cleaning portion has an outer face transverse of said pintle, said projections extending from said face away from said pintle and parallel thereto.

10. The hand press of claim 1 wherein said cleaning portion includes multiple projections thereon selectively introducible into and through said drainage apertures for removal of debris therefrom.

11. The hand press of claim 10 wherein one of said projections comprises a guide projection and is of greater length than the remaining projections for engagement within a corresponding guide aperture to position said projections for reception within the complimentary apertures.

12. In a hand press for foodstuffs, first and second opposed press components respectively comprising a receptacle with a portion thereof having multiple draining apertures therethrough, and a press member removably receivable within said receptacle, pivot means pivotally joining said press components for movement of said press components toward and away from each other, said pivot means comprising separate hinge elements joined to and extending outward relative to said first and second press components, said separate hinge elements aligning with each other and defining a passage transversely therethrough, and a hinge pintle removably received within said passage and retaining said hinge elements for pivotal movement of said press components relative to each other, and a cleaning member on said pintle manipulable, upon removal of said pintle from said passage, to engage and clean said draining apertures, said pintle defining a handle for said cleaning member.

* * * * *